(12) United States Patent
Rabinowitz et al.

(10) Patent No.: US 11,410,243 B2
(45) Date of Patent: Aug. 9, 2022

(54) SEGMENTED ACTUARIAL MODELING

(71) Applicant: Clover Health, Jersey City, NJ (US)

(72) Inventors: Judah Rabinowitz, Jersey City, NJ (US); John Henrik Rogers, San Francisco, CA (US); Ivy Jiangxia Dong, Jersey City, NJ (US); Julia Wu, San Francisco, CA (US)

(73) Assignee: Clover Health, Jersey City, NJ (US)

( * ) Notice: Subject to any disclaimer, the term of this patent is extended or adjusted under 35 U.S.C. 154(b) by 0 days.

(21) Appl. No.: 16/242,809

(22) Filed: Jan. 8, 2019

(65) Prior Publication Data
US 2020/0219199 A1    Jul. 9, 2020

(51) Int. Cl.
*G06Q 40/08* (2012.01)
*G06Q 10/06* (2012.01)

(52) U.S. Cl.
CPC ........... *G06Q 40/08* (2013.01); *G06Q 10/067* (2013.01); *G06Q 10/06393* (2013.01)

(58) Field of Classification Search
CPC ........ G06Q 40/08; G06Q 10/10; G06Q 40/02; G06Q 50/22; G06Q 10/0635; G06Q 10/0833; G06Q 20/0855; G06Q 30/02; G06Q 50/24; G06Q 50/30; G06Q 10/06393; G06Q 10/067; G07C 5/008; G07C 5/08; G07C 5/0808; G07C 5/0816; G07C 5/085; B60Q 9/00; B60R 2021/0027; B60R 21/00; B60W 2040/0818; B60W 30/16; B60W 40/09; G05B 15/02; G06F 19/328; G06F 30/20; G06K 9/00845; G08B 21/06; G08B 25/08; G08G 1/005; G08G 1/096725; G08G 1/096741; G08G 1/09675; G08G 1/096758; G08G 1/096775; G08G 1/096783; G08G 1/096791; G08G 1/143; G08G 1/147; G08G 1/164; G08G 1/165; G08G 1/166; G08G 1/167; G08G 1/205; G01S 19/13; G16H 50/30; H04L 67/12; H04W 4/44;
(Continued)

(56) References Cited
U.S. PATENT DOCUMENTS 5,182,705 A * 1/1993 Barr ................. G06Q 10/06311
                                                                705/7.16
5,613,072 A * 3/1997 Hammond ........... G06Q 10/105
                                                                705/35

(Continued)

OTHER PUBLICATIONS

PCT Search Report and Written Opinion for PCT Application No. PCT/US19/65037, dated Feb. 19, 2020, 9 pages.

*Primary Examiner* — Slade E Smith
(74) *Attorney, Agent, or Firm* — Lee & Hayes, P.C.

(57) ABSTRACT

Systems and methods for segmenting claims data for actuarial modeling are disclosed. For example, traditional actuarial models determine the money paid out in a given month and estimate future months based at least in part on the money paid out, but these traditional models fail when dealing with volatile data for new markets and/or expanding member base. The presently-disclosed systems and methods segments data into incremental metrics and uses the segmented data to provide more granular information about the claims. Increasing granularity in data not only increases accuracy for predictions but the new actuarial model developed using segmented data may also be used as market analysis tools to predict favorable new markets to enter.

20 Claims, 6 Drawing Sheets

(58) Field of Classification Search
CPC .......... H04W 4/46; H04W 4/90; Y02A 90/22; Y02A 90/02
USPC .................................................. 705/4
See application file for complete search history.

(56) References Cited

U.S. PATENT DOCUMENTS

| | | | | |
|---|---|---|---|---|
| 6,473,084 | B1* | 10/2002 | Phillips | G06Q 40/04 345/440 |
| 6,606,615 | B1* | 8/2003 | Jennings | G06Q 10/06 706/45 |
| 7,072,863 | B1* | 7/2006 | Phillips | G06Q 40/00 703/2 |
| 7,392,201 | B1* | 6/2008 | Binns | G06Q 10/10 705/4 |
| 7,523,065 | B2* | 4/2009 | Eder | G06Q 40/00 705/35 |
| 7,840,422 | B1* | 11/2010 | Hail | G06Q 10/087 705/4 |
| 8,099,303 | B1* | 1/2012 | Battaglia | G06Q 10/10 705/3 |
| 8,423,388 | B1* | 4/2013 | Galusha | G06Q 10/10 705/4 |
| 8,560,421 | B1* | 10/2013 | Erlanger | G06Q 40/06 705/36 R |
| 8,566,206 | B2* | 10/2013 | Stolerman | G06Q 40/06 705/36 R |
| 8,935,198 | B1* | 1/2015 | Phillips | G06Q 40/00 706/62 |
| 9,792,656 | B1* | 10/2017 | Konrardy | H04W 4/90 |
| 2002/0035488 | A1* | 3/2002 | Aquila | G06Q 40/08 705/4 |
| 2002/0147670 | A1* | 10/2002 | Lange | G06Q 40/04 705/35 |
| 2002/0152098 | A1* | 10/2002 | Evans | G06Q 40/08 705/4 |
| 2002/0152157 | A1* | 10/2002 | Stoyanov | G06Q 40/02 705/38 |
| 2002/0176500 | A1* | 11/2002 | Bakhmutsky | H04N 19/137 375/240.13 |
| 2003/0083757 | A1* | 5/2003 | Card | G05B 13/027 700/28 |
| 2003/0115128 | A1* | 6/2003 | Lange | H01L 29/4941 705/37 |
| 2003/0167151 | A1* | 9/2003 | Ding | G06Q 10/06 702/186 |
| 2003/0217019 | A1* | 11/2003 | Weiss | G06Q 50/06 705/412 |
| 2003/0236738 | A1* | 12/2003 | Lange | G06Q 30/08 705/37 |
| 2004/0019470 | A1* | 1/2004 | Card | G05B 13/042 703/2 |
| 2004/0064062 | A1* | 4/2004 | Zhou | A61B 5/349 600/515 |
| 2004/0111358 | A1* | 6/2004 | Lange | H01L 21/28061 705/37 |
| 2005/0114253 | A1* | 5/2005 | Low, III | G06Q 10/10 705/37 |
| 2005/0119919 | A1* | 6/2005 | Eder | G06Q 40/00 705/4 |
| 2005/0186921 | A1* | 8/2005 | Hoo | H04B 7/0608 455/121 |
| 2005/0234742 | A1* | 10/2005 | Hodgdon | G06Q 30/02 705/2 |
| 2006/0116914 | A1* | 6/2006 | Stemple | G06Q 40/08 705/4 |
| 2006/0136273 | A1* | 6/2006 | Zizzamia | G06Q 40/08 705/4 |
| 2007/0016542 | A1* | 1/2007 | Rosauer | G06N 5/022 706/21 |
| 2007/0237098 | A1* | 10/2007 | Wang | H04L 65/608 370/256 |
| 2007/0244777 | A1* | 10/2007 | Torre | G06Q 40/06 705/35 |
| 2008/0077451 | A1* | 3/2008 | Anthony | G06Q 10/10 705/4 |
| 2009/0048961 | A1* | 2/2009 | Mott | G06Q 40/04 705/37 |
| 2009/0157436 | A1* | 6/2009 | Craycraft | G06Q 10/10 705/4 |
| 2010/0318487 | A1* | 12/2010 | Marvasti | G06N 20/00 706/47 |
| 2011/0060215 | A1* | 3/2011 | Tupin, Jr. | A61B 5/091 600/425 |
| 2011/0077977 | A1* | 3/2011 | Collins | G06Q 40/08 705/4 |
| 2011/0137686 | A1* | 6/2011 | Mott | G06Q 40/08 705/4 |
| 2011/0270898 | A1* | 11/2011 | Guyan | G06Q 40/08 707/805 |
| 2011/0282964 | A1* | 11/2011 | Krishnaswamy | G06Q 30/02 709/217 |
| 2012/0209634 | A1* | 8/2012 | Ling | G06Q 10/0833 705/4 |
| 2012/0239582 | A1* | 9/2012 | Solari | G06Q 30/08 705/306 |
| 2013/0031026 | A1* | 1/2013 | Gibbs | G06Q 40/025 705/36 R |
| 2013/0110555 | A1* | 5/2013 | Dunham | G06Q 40/08 705/4 |
| 2013/0151283 | A1* | 6/2013 | Ranicar, III | G06Q 40/00 705/2 |
| 2013/0274955 | A1* | 10/2013 | Rosenbaum | G07C 5/008 701/1 |
| 2013/0346097 | A1* | 12/2013 | Adams | G06N 20/00 705/2 |
| 2015/0058046 | A1* | 2/2015 | Huynh | G06Q 40/08 705/4 |
| 2015/0170288 | A1* | 6/2015 | Harton | G06Q 40/08 705/4 |
| 2015/0317337 | A1* | 11/2015 | Edgar | G16H 50/70 707/751 |
| 2016/0063425 | A1* | 3/2016 | Fettig | G06Q 10/06393 705/7.39 |
| 2016/0162733 | A1* | 6/2016 | Rouh | G06V 30/416 382/103 |
| 2016/0342751 | A1* | 11/2016 | Alstad | G06Q 40/08 |
| 2017/0063645 | A1* | 3/2017 | Testa | H04L 41/5035 |
| 2017/0075806 | A1* | 3/2017 | Li | G06F 12/023 |
| 2017/0098193 | A1* | 4/2017 | Roberts | G06Q 10/1057 |
| 2017/0124662 | A1* | 5/2017 | Crabtree | G06Q 40/08 |
| 2017/0132711 | A1* | 5/2017 | Bruffey | G06Q 40/08 |
| 2017/0178093 | A1* | 6/2017 | Bull | G06Q 20/10 |
| 2017/0186093 | A1* | 6/2017 | Jones | G06N 20/00 |
| 2018/0040064 | A1* | 2/2018 | Grigg | G06N 5/022 |
| 2018/0075538 | A1* | 3/2018 | Konrardy | G08G 1/096783 |
| 2019/0063937 | A1* | 2/2019 | Moore | G01C 21/3697 |
| 2019/0259103 | A1* | 8/2019 | Coonrod | G06Q 40/08 |

* cited by examiner

Market Test

Number of Claims: 5,378
Claims Paid: 4,021
Contracted-For Payment: 245,658
Money Paid by Members: 125,645
Estimated Reserve: 120,013

Number of Claims: 5,378
Claims Paid: __
Contracted-For Payment: __
Money Paid by Members: __
Estimated Reserve:

Accept

FIG. 4

SEGMENTED ACTUARIAL MODELING

BACKGROUND

Historical data from a similar time period (e.g., same month, same quarter, same season, etc.) may be used by actuarial models to predict reserve needed for future payments. For example, models for insurance providers may look at how much money is paid out in a given month and estimate whether that amount will increase or decrease for future months. In some instances, predicting reserves for a growing insurer may be difficult due to the lack of general data and/or market specific data for a new location. Means to determine predictions based less on large data stores of historical data may be desired. Described herein are improvements in technology and solutions to technical problems that can be used to, among other things, determine predictions by segmenting data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a schematic diagram showing an example user interface that may be presented to a user for testing hypothetical values in metric fields and impact on predictions.

DETAILED DESCRIPTION

Figure 1:
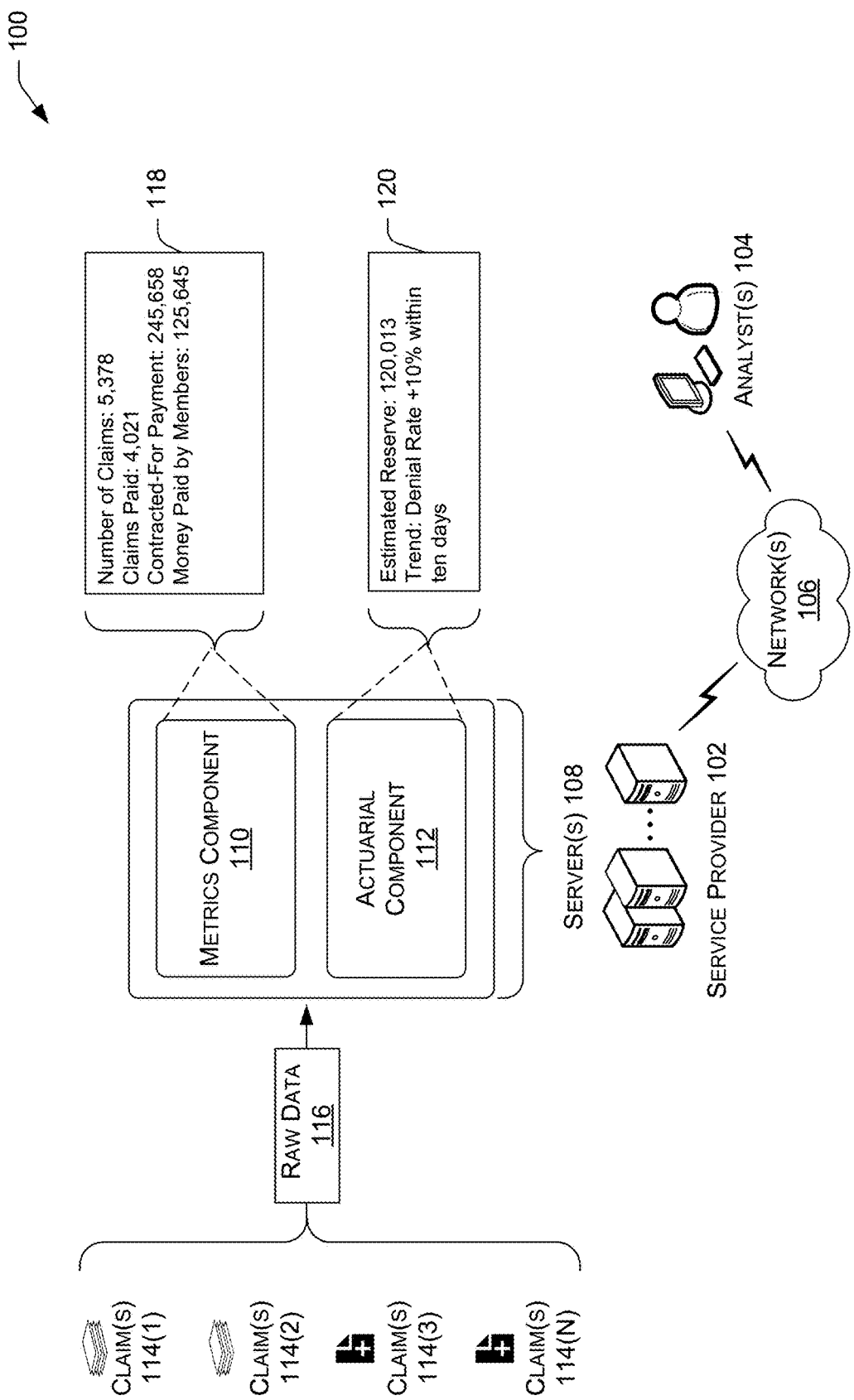
FIG. 1 illustrates a schematic diagram of an example system for segmenting data for actuarial models.

Systems and methods for actuarial models utilizing segmented data are described herein. Take, for example, healthcare systems that may use actuarial models to predict the amount of money that may be paid out for claims and predict the amount of reserve associated with the payment. This may be described as incurred but not reported (IBNR) reserve. Each system may utilize its own data to, for example, determine the IBNR reserve for the system. A given system may use its own data with a traditional model that looks at how quickly money has been paid out in relation to when a service is rendered in prior periods, and extrapolate that relationship to current periods. However, this traditional model may not work well for systems that are expanding their member base and/or expanding into a new market because claims payment speed for the expanding member base and/or new market may be inconsistent with a current member base and/or market. Similarly, changes in contracting or claims adjudication procedures can also render prior data unreliable for the purposes of this extrapolation. For instance, a new member base may include different age groups afflicted with different health issues. Additionally, the new market may charge different prices for similar services. The addition of new providers to a healthcare network may result in different contract terms with different contracted-for payments. In these and other examples, the need arises to increase accuracy for reserve predictions while using a smaller historical data set and/or a more volatile data set.

The present innovation is directed to systems and methods for actuarial models that utilizes segmented data, in which certain information in the claims data is broken down into metrics. For example, an insurance actuarial model may break data down to incrementally determine the number of claims, the contracted-for payment, denial rates, and/or money paid by members for a given time period to make predictions and/or generate estimates for the reserve needed. Having these additional granular metrics not only allows for more accurate predictions but can be leveraged to determine market trends.

Implementations of the techniques and systems described herein can improve existing technologies (e.g., actuarial modeling technologies), and can improve the functioning of the systems with respect to traditional systems. In particular, the implementations described herein allow an actuarial modeling system to analyze, process, and segment the data into metrics of interest, to look at data with more granularity rather than as aggregated data over a specific time period, to stochastically estimate the metrics, and/or to validate the estimates. By automatically segmenting information within the data into metric categories, each data object may provide more detailed information. By analyzing and processing the data incrementally, the time period for the data could be dynamically determined and be as short as a day, unlike the traditional specific time period for aggregated data.

By automatically segmenting the data into categories, the system may automatically provide more detailed information while requiring less analyst time to manually process the data. For instance, data may be segmented into four categories of metrics of interest. Each of these four categories of data may relate to a metric for measuring information associated with the categories. Thus, by automatically breaking down and/or segmenting the data, the system may readily and automatically report this useful information while making more accurate predictions. Additionally, by automatically reporting and distributing this information, resources, such as networking resources, may also be conserved by, for example, refraining from querying multiple databases to gather and analyze the data. In addition to automatically reporting useful information, this system may be configured to analyze time-agnostic data rather than the traditional time-specific data. Traditional systems aggregate data for a specific time period (e.g., monthly, quarterly, etc.) and then analyze the time-specific data, unlike time-agnostic data, which may analyze the data with less aggregation by using short time increments (e.g., daily). By looking at the segmented data that is time agnostic, the data analysis may generate information derived from the data with more details and/or granularity. Such detailed data may be used to plot time series graphs, for example, and may be used to determine emerging trends associated with the data.

Moreover, because this actuarial modeling system uses incremental metrics to generate a new actuarial model for predicting reserves, this newly-generated actuarial model may be leveraged as a predictive tool such that the values for the metrics may be replaced with hypothetical, incremental changes to see how such changes could affect the predictions. For instance, after generating an actuarial model with real data associated with claims, contracted-for payment, denial rates, and/or money paid by members, the field for the contracted-for payment could be replaced with hypothetical contract terms to determine whether the provider contract should be renegotiated. Additionally, this newly generated actuarial model may be similarly used as a predictive tool to determine which markets are favorable for the service provider to enter into based at least in part on information gathered for the new market that is related to the metrics.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for segmenting data for actuarial modeling. The system 100 may include, for example, user(s) including analyst(s) 104 that utilize device(s), through one or more network(s) 106, to interact with a service provider 102. In examples, the network(s) 106 may be any type of network known in the art, such as the Internet. Moreover, the service provider 102 and/or the device(s) may communicatively couple to the network(s) 106 in any manner, such as by a wired or wireless connection.

The service provider 102 may be any entity, healthcare organization, insurance provider, server(s), platform, etc., that provides any type of service (e.g., medical, vision, dental, prescription, etc.) to member(s) and that keeps records of claims for the member(s). In examples, the service provider 102 may provide websites and/or apps for member(s) to view their own claims and/or file claims. In various examples, the service provider 102 may employ one or more analyst(s) 104 (also referred to as an administrator, support personnel, actuary, etc.) to provide support for the server(s) 108 and to create actuarial models and tools. As shown, the service provider 102 may include one or more server(s) 108. The server(s) 108 may be implemented in a non-distributed computing environment and/or may be implemented in a distributed computing environment, possibly by running one or more components on computing device(s) and/or other remotely-located devices. The server(s) 108 may be any type of server, such as a network-accessible server.

In various examples, the service provider 102 may present the claims and payments on behalf of the user(s), health services, and/or entities. In at least one example, the service provider 102 described herein may cause one or more user interfaces to be presented to user(s) via computing device(s). The user interface(s) may allow the user(s) to create user accounts to access the system, among other possible uses.

The user(s) (e.g., customer, member, subscriber, provider, analysts, etc.) may interact with the service provider 102 via a site (i.e., a website), a service provider application, a self-service interface, a self-service portal, and/or in any other manner. The user(s) may interact with the service provider 102 to receive user data (e.g., medical record, claims, payments, etc.) and/or add user data (e.g., user information, payment instruments, etc.).

In examples, the user(s) may operate corresponding computing device(s) to perform various functions associated with the computing device(s), which may include at least some of the operations and/or components discussed above with respect to the server(s) 108. The user(s) may operate computing device(s) using any input/output devices including but not limited to mouse, monitors, displays, augmented glasses, keyboard, cameras, microphones, and speakers.

The network(s) 106 may enable communications between the components and/or devices shown in system 100 and/or with one or more other remote systems, as well as other networked devices. Such network(s) 106 may include one or more network interface controllers (NICs) or other types of transceiver devices to send and receive communications over the network.

For instance, each of the network(s) 106 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network(s) 106 may include a wide area network (WAN) component to enable communication over a wide area network.

The analyst(s) 104 may interact with device(s) of the server(s) 108 and/or use one or more other devices to interact with the server(s) 108 through the network(s) 106. In examples, the analyst(s) 104 may interact with the device(s) to perform various functions associated with the service provider 102, which may include at least some of the operations and/or components discussed above with respect to the server(s) 108.

The analyst(s) 104 may have access to viewing the member claims and associated data. In various examples, the analyst(s) 104 may override values for metrics and/or label data to train the models. Initially, the analyst(s) 104 may label the training data to generate the initial models. As the system learns from the training data, the system may automatically generate actuarial models and automatically perform incremental (e.g., daily) analysis on new data and store the results. Using the analyzed data, the system may generate market analysis tools that may include tools to determine the metrics that are relevant to data analysis and to perform reserve predictions. In various examples, the analyst(s) 104 may interact with the generated market analysis tools to perform tests with hypothetical values for metric fields to determine how hypothetical changes would impact the predictions and/or estimated reserve. In additional examples, the analyst(s) 104 and/or the service provider 102 may determine hypothetical value ranges for the metric fields to determine how hypothetical changes would impact the predictions and/or estimated reserve, and the system may generate graphs in response to the hypothetical value range.

In at least one configuration, the server(s) 108 may include any components that may be used to facilitate interaction between the service provider 102 and the computing device(s). For example, the server(s) 108 may include the metrics component 110 and the actuarial component 112.

The metrics component 110 may receive data associated with user records and claims and may automatically analyze the data to determine metrics associated with predetermined categories. A claim may include an invoice for payment for service rendered by a healthcare provider. Additionally, the claims may include any known claims, however the system may also include any Incurred But Not Reported (IBNR) claims associated with healthcare services rendered by any department or system for a member subscribing to the service provider 102 that has yet to be invoiced and/or recorded. User records may include healthcare records that are associated with the claims data to provide evidence of the service rendered or evidence of the validity of the claim for a subscribing member of the service provider 102. For instance, a subscribing member of the service provider 102 may visit the doctor for an annual exam, and the claim may include an invoice for the office visit and the user record may include a general health chart and blood test results for blood sugar level. A user and/or subscribing member may also manually add user records by visiting the provider's website and uploading a receipt after purchasing a prescribed health device that may be covered by a claim. A provider may also upload claims data based at least in part on an expected and/or ongoing treatment plan for payment pre-approval. The data associated with the claims may include any electronic records and/or scanned physical files records, and/or may further include data associated with contract terms including terms identifying the eligibility of the claim and/or the contracted-for payment associated with the service rendered.

Additionally, the metrics component 110 may analyze the data to identify information associated with metrics of predetermined categories. The predetermined categories may include any measurable metrics of information that influence the predictions. For instance, to predict the IBNR reserve, the metrics may include the total number of claims, the contracted-for payment for each claim, denial rate for the claims, and/or amount covered by the members.

After determining the metrics associated with predetermined categories from the data, the metrics component 110 may determine if there are trends. That is, the system may determine a trend that is a pattern of incremental changes in the metrics, based at least in part on the metrics over a predetermined time period. The system may generate notification data indicating the changes falling outside of the trend beyond a threshold amount. The notification data may be transmitted to an analyst device. The system may cause an application on the analyst device to initiate and cause display of the notification for the analyst(s) 104 to verify and/or review for anomaly. Initially, the analyst(s) 104 may set a default threshold amount (e.g., 5%, 10%, etc.), but over time, the system may determine the pattern of incremental changes and/or determine when the change falls outside of the pattern. Then system may generate an alert with a message regarding the change to flag the analyst(s) 104 to changes to check for anomaly. For instance, if the system determines that the denial rate increases or drops by 4% from week to week as a trend, but in the current week, the denial rate dropped by 8%, the system may display a message regarding the 8% drop in denial rate for the analyst(s) 104 to review. In various examples, the system may generate an alert with the message regarding the 8% drop in denial rate and/or transmit the message to the analyst(s) 104 to changes to check for anomaly.

The actuarial component 112 may perform predictions using segmented data. The actuarial component 112 may interact with the metrics component 110 to receive segmented data, or data having metrics associated with categories. In various examples, the actuarial component 112 may automatically interact with the metrics component 110 to trigger data analysis. Initially, the actuarial component 112 may perform data analysis based at least in part on initial training data created by the analyst(s) 104 and/or rules generated by the system as results of additional data gathered by the system. As the actuarial component 112 learns from the training data and/or computes confidence score associated with the data results that exceeds a predetermine level, the actuarial component 112 may determine to automatically perform data analysis and/or saving the results. In examples, the actuarial component 112 may generate predictions based at least in part on the data and/or metrics. In additional examples, the actuarial component 112 may generate reports based at least in part on the predictions.

As a non-limiting example, the example system 100 may illustrate an exemplary process of segmenting data for actuarial models. Initially, the system may receive the example claims 114(1)-114(N) (individually and/or collectively referred to herein with reference 114) for members. The example claims 114 may include any known claims having data stored within the system, however the system may also include any IBNR claims associated with a subscribing member of the service provider 102 that has yet to be invoiced and/or recorded. The example claims 114 may include any electronic records and/or scanned physical files records and/or may be stored as the example raw data 116. The metrics component 110 may receive the example raw data 116 and/or analyze the data to determine the information for the example metrics 118.

The example claims 114 may store any user records as the example raw data 116 including records associated with a member using a service from any department or system of the service provider 102. For instance, the user record for the example claims 114(1) may include a dental record and/or dental x-rays following a dental exam; the user record for the example claims 114(2) may include a batch of written records from the nurse making house calls; the user record for the example claims 114(3) may include retinal scans and/or prescription for glasses following a routine eye exam; and the user record for the example claims 114(N) may also include electronic record from a routine office visit to the doctor's office. A user and/or subscribing member may also manually add user records by visiting the provider's website and/or uploading a receipt after purchasing a prescribed health device that may be covered by a claim. A provider may also upload claims data based at least in part on an expected service plan. For instance, after an initial dental consultation, a dentist may manually add a treatment plan for a member.

The example metrics 118 include the metrics associated with the number of claims, claims paid out by the service provider 102, the contracted-for payment for each claim paid out, and/or plan responsibility. The plan responsibility may include the money paid by the plan after money paid by members (e.g., copay, deductible, etc.). The actuarial component 112 may interact with the metrics component 110 to receive the processed and/or segmented data including the example metrics 118. Using the segmented data, the actuarial component 112 may determine the example results 120 including the estimated reserve needed to pay for the claims and/or trends in the metrics as identified by the metrics component 110.

Figure 2:
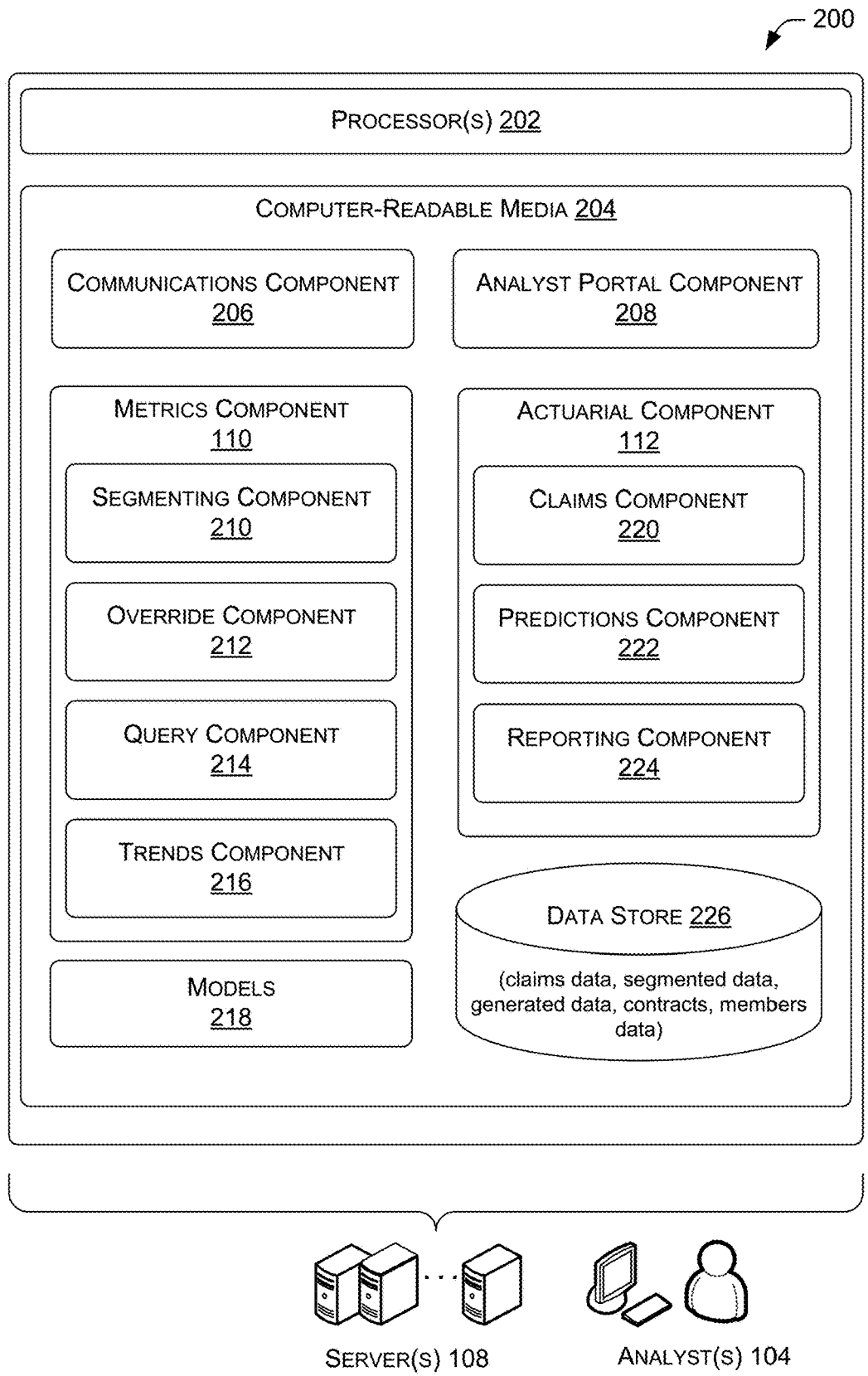
FIG. 2 illustrates a block diagram of a computing architecture of a system for segmented actuarial modeling.

FIG. 2 is a block diagram of an illustrative computing architecture 200 of the server(s) 108. The computing architecture 200 may be implemented in a distributed or non-distributed computing environment.

The computing architecture 200 may include one or more processor(s) 202 and one or more computer-readable media 204 that stores various components, data structures, applications, programs, or other data. The computer-readable media 204 may include instructions that, when executed by the one or more processor(s) 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some configurations the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

In some configurations, the computer-readable media 204 may store the communication component 206, the analyst portal component 208, the metrics component 110 and associated components, the models 218, the actuarial component 112 and associated components, and the data store 226, which are described in turn. The components may be stored together and/or in a distributed arrangement.

The communication component 206 may facilitate communication between the user(s) and the service provider 102. The communication component 206 may present various user interfaces to communicate with the user(s). In examples, the communication component 206 may present user interface allowing the user(s) to create different types of user accounts (e.g., patient, healthcare provider, data scientists, etc.) with the service provider 102. In at least one example, the communication component 206 may receive information associated with user(s) with a member account such as user information (e.g., name, address, age, profession, billing information, insurance, demographic, medications, allergies, etc.) and/or actions associated with a member account for the user(s) (e.g., visits, appointments, tests, immunization record, recent travels, etc.).

The analyst portal component 208 may allow the analyst(s) 104 to interact with modeling tools to perform queries and/or test hypothetical values for models. The analyst portal component 208 may facilitate communication between device(s) associated with the analyst(s) 104 and the service provider 102. In examples, the analyst portal component 208 may include local application access from the server(s) 108 and/or a web access portal. In various examples, the analyst portal component 208 may allow the analyst(s) 104 to add rules to generate push notifications to alert the analyst(s) 104 of event trigger. For instance, the system may determine a trend for the metrics based at least in part on automatic daily analysis, then if the system determines that one or more metrics falls outside of the trend for a current daily analysis, the system may automatically generate a new report and/or push a notification containing the report for the analyst(s) 104 may to be notified.

The metrics component 110 may include the segmenting component 210, the override component 212, the query component 214, and/or the trends component 216. In various examples, the metrics component 110 and/or one or more associated components may be part of a standalone application that may be installed and/or stored on the device(s).

The metrics component 110 may receive data, analyze the data to determine metrics associated with information categories of interest, and/or determine trends and/or predictions based at least in part on the metrics. To this end, the metrics component 110 may interact with the analyst portal component 208 to receive input on the categories of interest and/or may leverage its components and/or models 218 to train and/or evolve the system's prediction models. The metrics component 110 may be configured to generate one or more predictive models. The one or more predictive models may utilize predictive analytics to predict one or more outcomes (e.g., IBNR reserve). Predictive analytic techniques may include, for example, predictive modeling, machine learning, and/or data mining. Generally, predictive modeling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models 218 described herein. Those techniques may include, for example, decision tree learning, association rule learning, artificial neural networks (including, in examples, deep learning), inductive logic programming, support vector machines, clustering, Bayesian networks, reinforcement learning, representation learning, similarity and/or metric learning, sparse dictionary learning, and/or rules-based machine learning.

Initially, the system may retrieve data from one or more databases, such as for example the data store 226, to predict trends and/or behavior patterns. In examples, the estimated reserve, otherwise described herein as an outcome, may be a prediction for the amount of reserve need for payment in the future. The predictive analytic techniques may be utilized to determine associations and/or relationships between explanatory variables and/or predicted variables from past occurrences and/or utilizing these variables to predict the unknown outcome. The predictive analytic techniques may include defining the outcome and/or data sets used to predict the outcome. Then, data may be collected and/or accessed to be used for analysis, such as from the data store 226.

Data analysis may include using one or more models 218, including for example one or more algorithms, to inspect the data with the goal of identifying useful information (e.g., metrics) and/or arriving at one or more determinations (e.g., associating a weight with each metric) that assist in predicting the outcome of interest. One or more validation operations may be performed, such as using statistical analysis techniques, to validate accuracy of the models. Thereafter predictive modeling may be performed to generate accurate predictive models for future events. By so doing, the metrics component 110 and/or the actuarial component 112 may utilize data from the data store 226, as well as features from other systems as described herein, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence.

The metrics component 110 may receive data associated with user records and/or claims. A claim may include an invoice for payment for service rendered by healthcare provider. A user record may be any healthcare record included with the claims data to provide evidence of the service rendered or evidence of the validity of the claim for a subscribing member of the service provider 102. For instance, a subscribing member of the service provider 102 may visit the doctor for an annual exam, and/or the claim may include invoice for the office visit and/or the user record may include a general health chart and/or blood test results for blood sugar level. The data associated with the claims may include any electronic records and/or scanned physical files records, and/or may further include data associated with contract terms including terms determining the eligibility of the claim and/or the contracted-for payment associated with the service rendered.

Additionally, the metrics component 110 may automatically analyze the data to determine metrics and/or identify information associated with predetermined categories. The predetermined categories may include any measurable metrics of information that influences the predictions. For instance, to predict the IBNR reserve, the metrics may include the total number of claims, the contracted-for payment for each claim, denial rate for the claims, and/or amount covered by the members.

After determining the metrics associated with predetermined categories from the data, the metrics component 110 may determine if there are trends to notify the analysts to review. That is, the system may determine a trend that is a pattern of incremental changes in the metrics, based at least in part on the metrics over a predetermined time period. The system may flag the changes falling outside of the trend beyond a threshold amount for the analyst(s) 104 to check for anomaly. Initially, the analyst(s) 104 may set a default threshold amount (e.g., 5%, 10%, etc.), but over time, the system may determine the pattern of incremental changes and/or determine when the change falls outside of the pattern. Then system may generate an alert with a message regarding the change to flag the analyst(s) 104 to changes to check for anomaly. For instance, if the system determines that the denial rate fluctuates by up to 4% from week to week as a trend, but in the current week, the denial rate dropped by 8%, the system may generate an alert with a message regarding the 8% drop in denial rate and/or transmit the message to the analyst(s) 104 to changes to check for anomaly.

The segmenting component 210 may process raw data into segmented data that includes incremental data for metrics of interest. Initially, the segmenting component 210 may determine data associated with metrics of interest based at least in part on machine learning models 218 trained on data labeled with the metrics of interest by the analyst(s) 104. As the segmenting component 210 processes more data, the system may learn and/or generate rules to determine data associated with the metrics of interest. The segmenting component 210 may receive and/or process raw data associated with claims for members including user records generated in response to services rendered for the claims. The user records may be any type of record (e.g., dental chart, x-rays, retina scans, medical history, psych evaluation, billings, etc.) and/or may be in any format (e.g., electronic documents, paper chart, photos, etc.). In various examples, the segmenting component 210 may gather data associated with claims from some or all departments and/or systems of the service provider 102. For instance, the segmenting component 210 may receive an electronic record of a member immediately after a visit to the office and/or as a batch of scanned paper records at the end of the day, for example. The segmenting component 210 may analyze the data to identify information related to the metrics of interest and/or tag the metric information.

In an example, the segmenting component 210 may analyze the data to determine the information associated with four categories. The metric for the first category includes determining the claims the system currently knows about, such that the system has stored data associated with the known claims. This may be expressed as the number of claims in general and/or further broken down by predetermined claims groups. The metric for the second category measures how many of the number of known claims should be paid. Thus, the segmenting component 210 may analyze the known claims to determine if the service rendered would qualify for claims coverage. The segmenting component 210 may determine the qualifying claims based at least in part on a set of generated rules and/or criteria determined by contract terms. The metric for the third category includes determining the contracted-for payment for the qualifying claims. Thus, the segmenting component 210 may retrieve data associated with the contract for the service rendered and/or identify the coverage. The metric for the fourth category measures the plan responsibility. The plan responsibility may include the money paid by the plan after the money paid by members for the qualifying claims. The money paid by members may include money for copays and/or deductibles. In various examples, the segmenting component 210 may analyze the data automatically daily and/or periodically and/or on a scheduled basis and/or save the segmented data. By incrementally saving the segmented data including data associated with the four metrics, the system 200 may be configured to retrieve and/or aggregate data as needed and/or desired, rather than retrieve data already aggregated for a specific time period as with traditional methods. The segmenting component 210 may store the segmented data including the metrics to the data store 226.

The override component 212 may interact with the analyst portal component 208 to receive metrics data override. Initially, for new system setup, there may be insufficient data to properly determine how much of each claim is being paid and/or the appropriate contractual price, thus override component 212 may allow the analyst(s) 104 to override specific portions of the metrics to affect the estimates for the reserve. The override component 212 may store the override as a permanent or temporary override based at least in part on input from the analyst(s) 104. For instance, the analyst(s) 104 may know that the contracted-for price will be changing and wishes to change the values permanently. In another instance, the analyst(s) 104 may be using the override component 212 for temporary override when using the metrics component 110 and/or the actuarial component 112 as part of a market testing tool to test a potential new market and/or to test hypothetical amendments to an existing contract.

In examples, the override component 212 may store the permanent override data and/or use the data to train models to segment new data according to the override. Once trained, the override component 212 may use this newly trained model to automatically determine the metrics according to the new model. For instance, upon receiving new contracted-for price data, the override component 212 may automatically update the contracted-for price.

The query component 214 may retrieve data based at least in part on query inputs. The metrics component 110 may interact with the analyst portal component 208 and/or receive queries for the claims data. The query component 214 may receive the query input and/or retrieve data based at least in part on the query. In various examples, the query component 214 may aggregate the data according to query input and/or format the data for presentation. In various examples, the query component 214, the metrics component 110, and/or one or more associated components may be tools created by Python, SQL, and/or other languages. The query component 214 may receive query input including metacharacters, characters having special meaning, and/or regular expressions (called REs, or regexes, or regex patterns) that are specialized programming language embedded inside Python for character matching.

The trends component 216 may analyze changes in the segmented data and/or generate an alert for the analyst(s) 104 based at least in part on changes in the segmented data. Initially, trends component 216 may receive rules for generating alerts for further analysis from the analyst(s) 104. In various examples, as the trends component 216 gathers more data and/or the models 218 learn to identify trends in data, significant changes in the trends, measured by changes that deviates from identified trends by more than a threshold may automatically trigger alerts for further analysis from the analyst(s) 104. The trends component 216 may interact with the analyst portal component 208 to initiate the application with a user interface to display an alert along with the generated message and/or report. In examples, the trends component 216 may generate alerts that identify some factors affecting the trends. For instance, some of these factors may include a change in benefit design, a change in premium rate, and/or aging members block. In this example, a change in benefit design may affect which claims are allowable under the plan and/or the deductible from members. A change in premium rate may cause members to join or leave. Aging members block may include members groups (e.g., newly approved Medicare plan group) that enroll together and have illnesses and/or procedures that may be automatically approved or denied based on age.

As the metrics component 110 produces more segmented data and/or trends data associated with claims, the system models may learn from such data. Accordingly, the metrics component 110 may use any portion of the claims data, the segmented data, and/or the trends data as input to train one or more of machine learning models 218. Machine learning generally involves processing a set of examples (called "training data") in order to train a machine learning model(s) 218. A machine learning model, once trained, is a learned mechanism that can receive new data as input and/or estimate and/or predict a result as output. For example, a trained machine learning model can comprise a classifier that is tasked with classifying unknown input (e.g., an unknown image) as one of multiple class labels (e.g., labeling the image as a cat or a dog). In the context of the present disclosure, the unknown input may include, inter alia, claim data that may be associated with metrics of interest, and/or the trained machine learning model, or the system models, may be tasked with classifying the unknown input as one of multiple class labels. The class labels, in this case, may correspond to a classification of the unknown input as a type of category among multiple different types of categories corresponding to different metrics of interest.

The machine learning model(s) 218 may represent a single model or an ensemble of base-level machine learning models, and/or may be implemented as any type of machine learning model. For example, suitable machine learning models for use with the techniques and/or systems described herein include, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of models, as stored in the data store 226, whose outputs (classifications) are combined, such as by using weighted averaging or voting. The individual machine learning models 218 of an ensemble can differ in their expertise, and/or the ensemble can operate as a committee of individual machine learning models that is collectively "smarter" than any individual machine learning model of the ensemble.

The actuarial component 112 may include the claims component 220, the predictions component 222, and/or the reporting component 224. The actuarial component 112 includes components that works together to predict the reserve needed for claims and/or to improve the accuracy of the predictions. To this end, the actuarial component 112 may leverage its components and/or actuarial models to build and/or evolve the system's machine learning models 218. In various examples, the actuarial component 112 and/or one or more associated components may be part of a standalone application that may be installed and/or stored on the user computing device(s).

The claims component 220 may interact with the metrics component 110 to determine the handling of the claims during its life cycle. Upon receiving claim data, the claims component 220 may perform a claims determination process, a claims adjudication process, and/or subtract the adjudication results from the cost sharing. The claims component 220 may determine the claim from the data and/or may determine to pay the claim as submitted and/or to deny the claim after comparing the claim to the benefit and/or coverage requirements.

The predictions component 222 may interact with the metrics component 110 to generate predictions based at least in part on the metrics. Initially, the actuarial component 112 may need to generate additional data by bootstrapping existing data, by resampling the existing data and/or using the resampled data to populate the data store 226 in order for the predictions component 222 to have sufficient data to make accurate predictions. In additional and/or alternative examples, the actuarial component 112 may generate additional data by projecting claims data and its corresponding metrics. For instance, the actuarial component 112 may interact with the claims component 220 to determine known claims data, and to generate projected claims data and projected metrics, based at least in part on the known claims data. In examples, the actuarial component 112 may sample, project, and/or resample data using multiple methods including based on historical trends, similar claim categories, and/or similar claims age (e.g., same expected delay between encounter date and claim received date such as 30, 60, or 90 days) method.

In various examples, the predictions component 222 may receive instructions from the analyst(s) 104 to query the database and/or perform analysis to determine an amount of reserve needed for the claims. In additional and/or alternate examples, the predictions component 222 may generate models by taking in projections based on different sources and weight them to reduce variance. In examples, the analyst(s) 104 may assign different weights to these underlying projections and may modify the fields of the metrics with hypothetical values for the predictions component 222 to determine the predicted impact. In various examples, the analyst(s) 104 may revise the predicted estimates for the past to update the models and data. For instance, if the model is consistently over or under estimating the predicted reserve, the predictions component 222 may determine that the model is using incorrectly resampled and/or projected data and may modify the resampled and/or projected data to fit the actual reserve needed.

The reporting component 224 may interact with the analyst portal component 208 and/or the metrics component 110 to present metrics information and/or predictions. Initially, the analyst(s) 104 may have to manually request a daily report from the reporting component 224. This daily report is stored in data store 226. In various examples, the reporting component 224 may present the metrics information as stochastic models. The stochastic models may estimate the probability distribution of potential outcomes by allowing for random variation in one or more metrics over time. The reporting component 224 may generate reports that includes time-series graphs to present the stochastic models corresponding to the metrics and/or may determine confidence interval for models. As the system generates report that is accurate and/or requires little to no oversight from the analyst(s) 104 to make accurate predictions such that the system's confidence level is above a threshold level, the reporting component 224 may automatically generate a daily report, label the report, and/or store the report in data store 226. The reporting component 224 may provide other visual outputs, such as a time series graph that shows the metrics or information derived from the metrics, claims status (e.g., pending, paid, denied), historical summaries, and/or other visual outputs that use the metrics.

The data store 226 may store at least some data including, but not limited to, data collected from the communication component 206, the analyst portal component 208, the metrics component 110 and associated components, the models 218, and the actuarial component 112 and associated components, including data associated with members, claim data, records, and/or contracts. In various examples, the metrics component 110 may store segmented data, trends data, information models, and/or rules for classifying data into the metrics categories. In examples, the metrics component 110 and/or the actuarial component 112 may store claims data in tables formatted for tools to read including tables to identify pending, paid, and/or denied claims, the rules for determining the claim from the data, criteria for adjudication of the claims, and/or models for the tests, data gathered to measure the results including generated bootstrapped, sampled, resampled, and/or projected data, and/or the results of the tests. In an example, the data may be automatically added via a computing device (e.g., server(s) 108). In additional and/or alternative examples, at least some of the data may be stored in a cloud storage system and/or other data repository.

Figure 3:
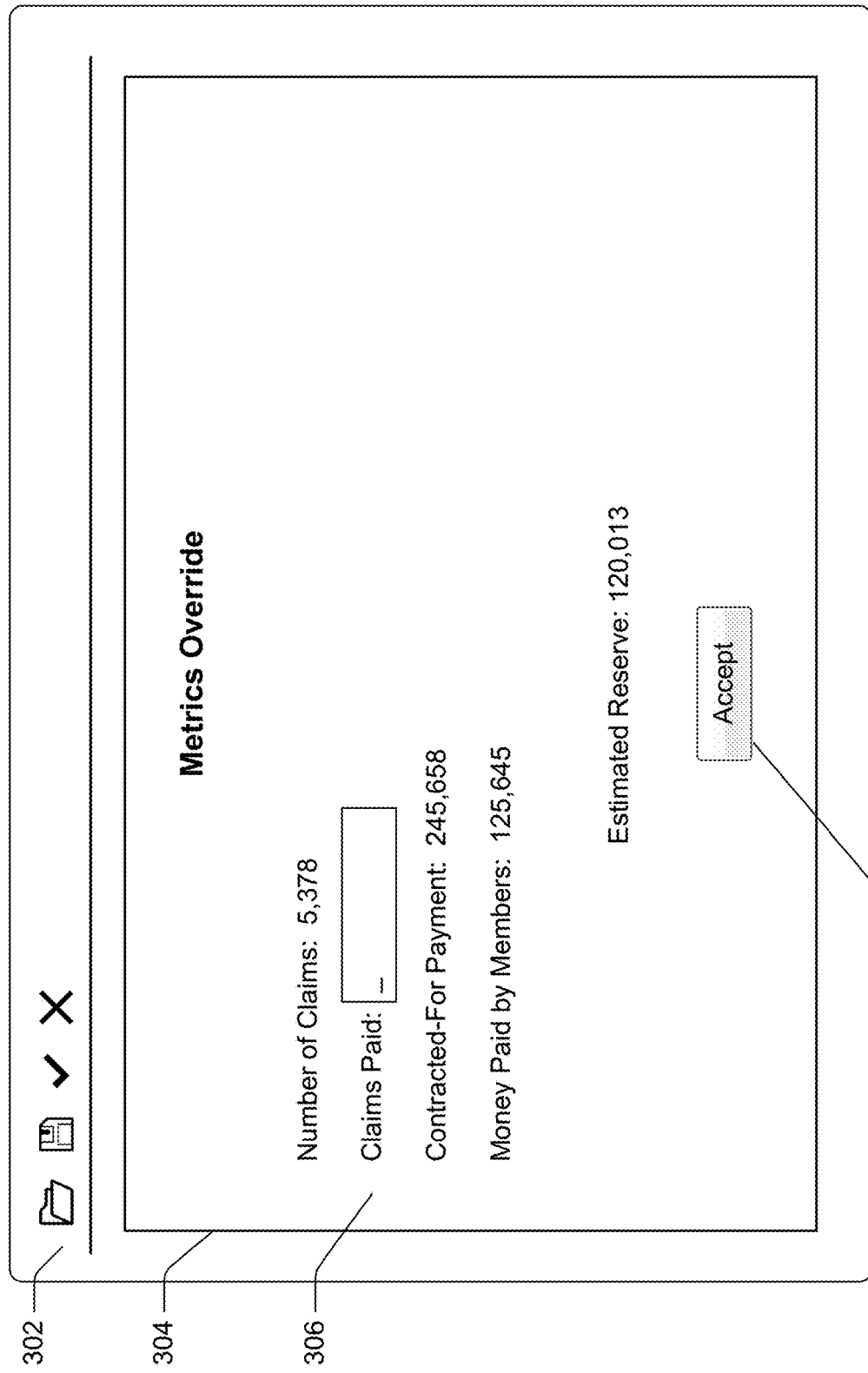
FIG. 3 illustrates a schematic diagram showing an example user interface that may be presented to a user for providing user input to change actuarial models.

FIG. 3 illustrates a schematic diagram showing an example user interface 300 that may be presented to a user for providing user input to change actuarial models. The analyst portal component 208 may interact with the override component 212 to present the example user interface 300 to receive metrics data override. The analyst portal component 208 may cause the example user interface 300 to be presented to an analyst(s) 104 utilizing any communication channel, such as a website associated with the service provider 102, and/or an application that is associated with the service provider 102 and/or that resides on device(s) corresponding to the analyst(s) 104.

As a non-limiting example, the example user interface 300 may include the example editing tools 302, the example metrics override window 304, the example override field 306, and/or the example accept button 308. The analyst portal component 208 may interact with the override component 212 to present the example metrics override window 304. In the present example, the example override field 306 shows that the claims paid metric has been selected for override and allows the analyst(s) 104 to override that specific portions of the metrics to affect the estimates for the reserve. Once the analyst hits the example accept button 308, the override component 212 may store the override as a permanent or temporary override based at least in part on input from the analyst(s) 104. The override component 212 may store the permanent override data and/or use the data to train models to segment new data according to the override. Once trained, the override component 212 may use this newly trained model to automatically determine the metrics according to the new model.

FIG. 4 illustrates a schematic diagram showing an example user interface 400 that may be presented to a user for testing hypothetical values in metric fields and/or impact on actuarial models. The analyst portal component 208 may interact with the override component 212 to present the example user interface 400 to receive hypothetical values in metric fields to perform market tests. The analyst portal component 208 may cause the example user interface 400 to be presented to an analyst(s) 104 utilizing any communication channel, such as a website associated with the service provider 102, and/or an application that is associated with the service provider 102 and/or that resides on device(s) corresponding to the analyst(s) 104.

As a non-limiting example, the example user interface 400 may include the example editing tools 402, the example market test window 404, the example market test field 406, and/or the example accept button 408. The analyst portal component 208 may interact with the override component 212 to present the example market test window 404. In the present example, the example market test field 406 is presented on user interface 400 to receive hypothetical values in metric fields to perform market tests using the actuarial model for the data on the left. Once the analyst hits the example accept button 408, the system may initiate the process to determine an estimated reserve for the hypothetical values.

Initially, the system may retrieve data to predict trends and/or behavior patterns. In examples, the estimated reserve for the hypothetical values, otherwise described herein as an outcome, may be a prediction for the reserve amount need for future payment. The predictive analytic techniques may be utilized to determine associations and/or relationships between current metric values and current estimated reserve and utilizing these variables to predict the unknown estimated reserve. The predictive analytic techniques may include defining the outcome and/or data sets used to predict the outcome. The example user interface 400 may present the estimated reserve for the hypothetical values to help determine which markets are favorable to enter. For instance, based at least in part on a small increase in the contracted-for payment in the example market test field 406 for a potential new market, if the outcome estimated reserve increased drastically without changes to the other fields, this indicate a non-favorable market to enter.

Figure 5:
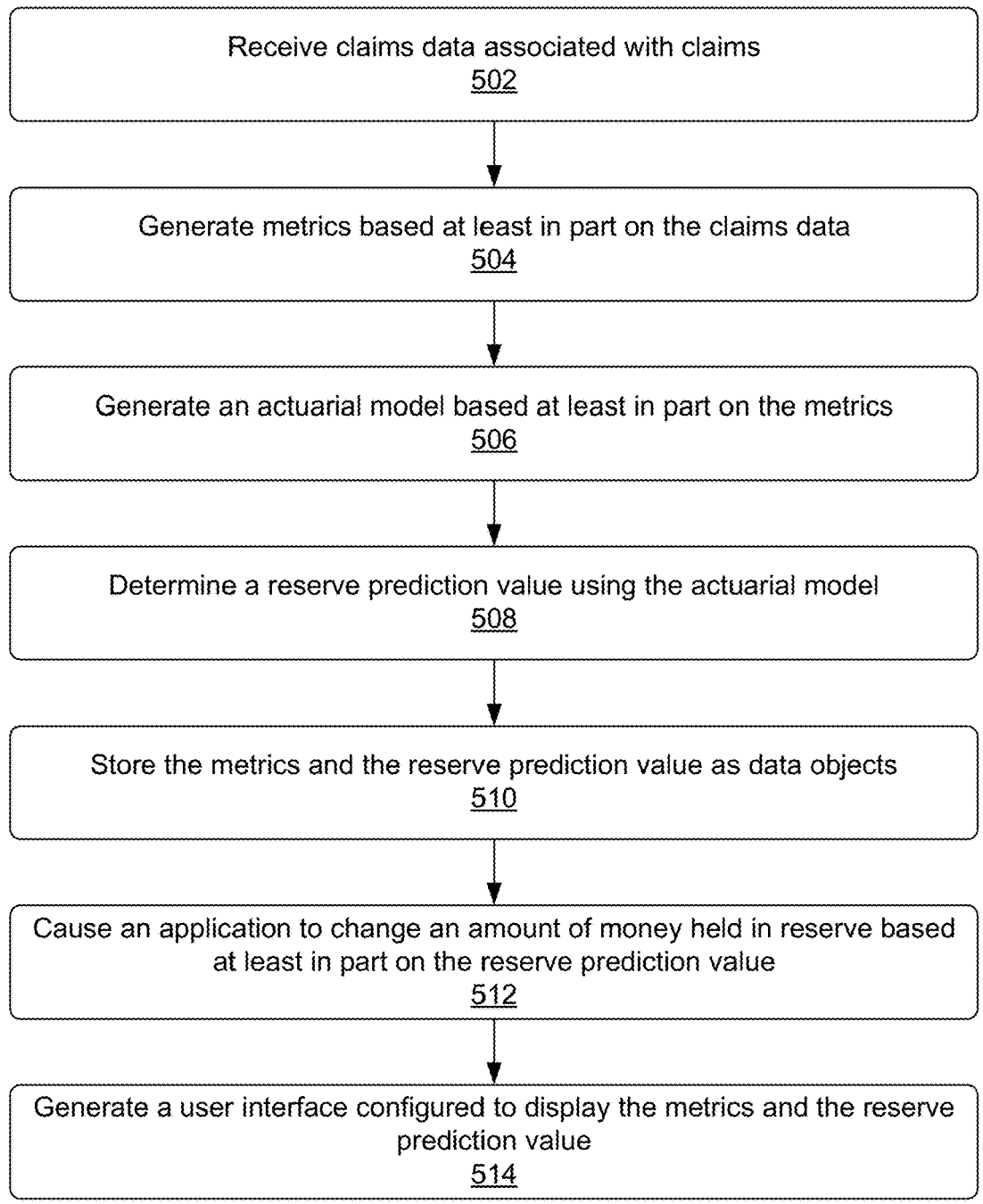
FIG. 5 illustrates a flow diagram of an example process for segmenting data for actuarial modeling.
Figure 6:
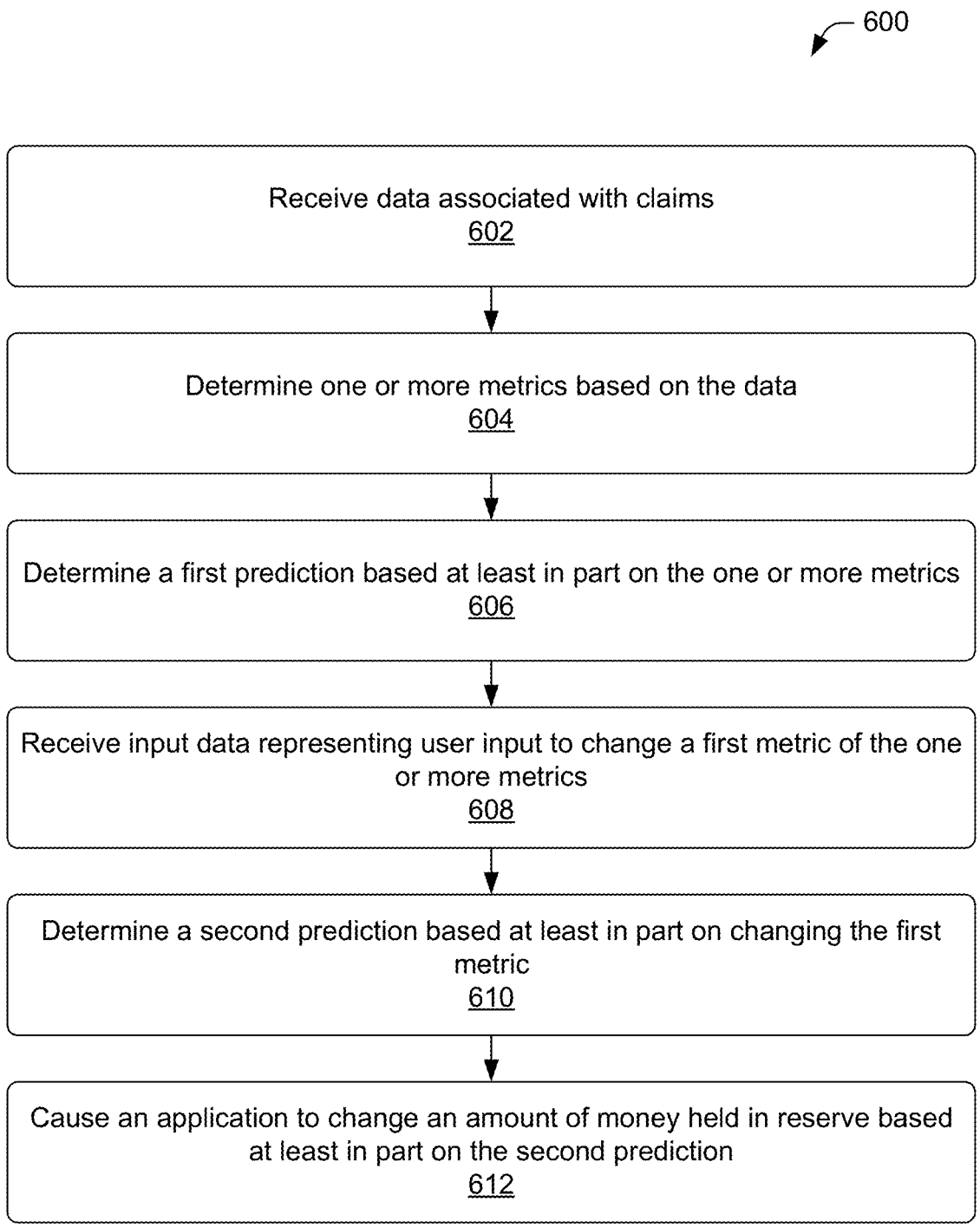
FIG. 6 illustrates a flow diagram of an example process for providing user input to change predictions for actuarial modeling.

FIGS. 5 and 6 are flow diagrams of illustrative processes for segmented actuarial modeling. The example processes are described in the context of the environments of FIGS. 1, 2, 3, and/or 4, but are not limited to those environments. The processes are illustrated as a collection of blocks in a logical flow graph, which represents a sequence of operations that can be implemented in hardware, software, or a combination thereof. In the context of software, the blocks represent computer-executable instructions stored on one or more computer-readable media 204 that, when executed by one or more processor(s) 202, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

FIG. 5 is a flow diagram of illustrative process 500 for segmenting data for actuarial modeling. The order in which the operations or steps are described is not intended to be construed as a limitation, and any number of the described operations may be combined in any order and/or in parallel to implement process 500.

At block 502, the process 500 may include receiving claims data indicating a claim status. The data may include data from different sources. The data sources for the user records may include any electronic record and/or scanned physical records. The user records may be any type of record (e.g., dental chart, x-rays, retina scans, medical history, psych evaluation, etc.) and/or may be in any format (e.g., electronic documents, paper chart, photos, etc.). The data may be associated with user from any department and/or system of the service provider. For instance, the data associated with medical records may include an electronic record of a user transmitted immediately after a visit to the office and/or a batch of scanned record transmitted at the end of the day from an office. The claim status may include at least one of a pending status, a paid status, or a denied status.

At block 504, the process 500 may include generating metrics based at least in part on the claims data. The system may analyze the data to identify information related to the metrics of interest and/or tag the metric information. The system may analyze the data to determine the information associated with four categories. The metrics may include a first metric including a first number of the claims from the claims data. The system may analyze the data to determine the information associated with four categories. The metric for the first category includes determining the claims the system currently knows about. This may be expressed as the number of all claims in general and/or further broken down by predetermined claims groups. The metrics may include a second metric including a second number of the claims indicated to be paid. The system may determine that the metric for the second category measures how many of the number of known claims should be paid. Thus, the system may look at the known claims to determine if the service rendered would qualify for claims coverage. The system may determine the qualifying claims based at least in part on a set of rules and/or criteria as set by contract and/or input by analyst(s) 104.

Additionally, the metrics may include a third metric including price data representing a contractual price for individual ones of the second number of the claims. The system may determine that the metric for the third category includes determining the contracted-for payment for the qualifying claims. Thus, the system may retrieve data associated with the contract for the service rendered and/or identify the coverage. The metrics may include a fourth metric including plan responsibility and/or a member-contribution value associated with the second number of the claims. The system may determine that the metric for the fourth category measures the plan responsibility. The plan responsibility may include the money paid by the plan after the money paid by members for the qualifying claims. The money paid by members may include money for copays and/or deductibles. In various examples, the system may analyze the data automatically daily and/or save the segmented data for each day. By incrementally saving the segmented data including data associated with the four metrics, an analyst(s) 104 may be able to manually set a time period to retrieve and/or aggregate data as needed, rather than retrieve data already aggregated for a specific time period as with traditional methods.

At block 506, the process 500 may include generating an actuarial model based at least in part on the metrics. The system may use the metrics to generate a new actuarial model for predicting reserves, this actuarial model may be leveraged as a predictive tool such that the values for the metrics may be replaced with hypothetical, incremental changes to see how such changes could affect the predictions. For instance, after generating an actuarial model with data associated with claims, contracted-for payment, denial rates, and/or money paid by members, the field for the contracted-for payment could be replaced with hypothetical contract terms to determine whether the provider contract should be renegotiated. Additionally, this newly generated actuarial model may be similarly used as a predictive tool to determine which markets are favorable for the service provider to enter into based at least in part on information gathered for the new market that is related to the metrics.

At block 508, the process 500 may include determining a reserve prediction value using the actuarial model. The system may generate predictions based at least in part on the metrics using the actuarial model. Initially, the system may need to generate additional data by bootstrapping existing data, by resampling the existing data and/or using the resampled data to populate the data store in order for the system to have sufficient data to make accurate predictions. In additional and/or alternative examples, the system may generate additional data by projecting claims data and its corresponding metrics. For instance, the system may determine known claims data and generate projected claims data and projected metrics, based at least in part on the known claims data. In examples, the system may sample, project, and/or resample data using multiple methods including based on historical trends and/or similar claims age method (e.g., claims that are 30, 60, or 90 days old). In various examples, the system may receive instructions from the analyst to query the database and/or perform analysis to determine an amount of reserve needed for the claims. In examples, the analyst may modify the fields of the metrics with hypothetical values for the system to evaluate the predicted impact.

At block 510, the process 500 may include storing the metrics and the reserve prediction value as data objects. The system may store the segmented data including the metrics to the data store 226. The data objects may be labeled by the current date to keep the daily generated data objects separated by date rather than aggregating the data by a time period, quarter, or season.

At block 512, the process 500 may include causing an application to change an amount of money held in reserve based at least in part on the reserve prediction value. The system may generate predictions based at least in part on the metrics. In various examples, the system may cause an application (e.g., external finance center application, internal actuarial application, etc.) to change an amount of money held in reserve.

At block 514, the process 500 may include generating a user interface configured to display the metrics and the reserve prediction value. The system may generate a user interface. The user interface may be configured to display the metrics and the reserve prediction value. Furthermore, the user interface may be configured to receive metrics data override. The system may store the override as a permanent or temporary override based at least in part on input from the analyst(s) 104. For instance, the analyst(s) 104 may know that the contracted-for price will be changing and/or wishes to change the values permanently.

FIG. 6 illustrates a flow diagram of an example process 600 for providing user input to change actuarial models. The order in which the operations or steps are described is not intended to be construed as a limitation, and any number of the described operations may be combined in any order and/or in parallel to implement process 600.

At block 602, the process 600 may include receiving data associated with claims. The data may include data from different sources. The data sources for the user records may include any electronic record and/or scanned physical records. The user records may be any type of record (e.g., dental chart, x-rays, retina scans, medical history, psych evaluation, etc.) and/or may be in any format (e.g., electronic documents, paper chart, photos, etc.). The data may be associated with user from any department and/or system of the service provider. For instance, the data associated with medical records may include an electronic record of a user transmitted immediately after a visit to the office and/or a batch of scanned record transmitted at the end of the day from an office.

At block 604, the process 600 may include determining one or more metrics based at least in part on the data. The system may analyze the data to identify information related to the metrics of interest and/or tag the metric information.

At block 606, the process 600 may include determining a first prediction based at least in part on the one or more metrics. The system may generate predictions based at least in part on the metrics. Initially, the system may need to generate additional data by bootstrapping existing data, by resampling the existing data and/or using the resampled data to populate the data store in order for the system to have sufficient data to make accurate predictions. In various examples, the system may receive instructions from the analyst(s) 104 to query the database and/or perform analysis to determine an amount of reserve needed for the claims. In examples, the analyst(s) 104 may modify the fields of the metrics with hypothetical values for the system to evaluate the predicted impact.

At block 608, the process 600 may include receiving input data representing user input to change a first metric of the one or more metrics. The system may receive metrics data override. Initially, for new system setup, there may be insufficient data to properly determine how much of each claim is being paid and/or the appropriate contractual price, thus system may allow the analyst(s) 104 to override specific portions of the metrics to affect the estimates for the reserve. The system may store the override as a permanent or temporary override based at least in part on input from the analyst(s) 104. For instance, the analyst(s) 104 may know that the contracted-for price will be changing and/or wishes to change the values permanently.

At block 610, the process 600 may include determining a second prediction based at least in part on changing the first metric. The system may generate new predictions based at least in part on the new metrics. Initially, the system may need to generate additional data by bootstrapping existing data, by resampling the existing data and/or using the resampled data to populate the data store 226 in order for the system to have sufficient data to make accurate predictions. In various examples, the system may receive instructions from the analyst(s) 104 to query the database and/or perform analysis to determine an amount of reserve needed for the claims.

At block 612, the process 600 may include causing an application to change an amount of money held in reserve based at least in part on the second prediction. The system may generate predictions based at least in part on the metrics and/or changes in the metrics. In additional examples, the system may cause an application (e.g., external finance center application, internal actuarial application, etc.) to change an amount of money held in reserve.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system, comprising:
one or more processors; and
computer-readable media storing computer-executable instructions that, when executed by the one or more processors, cause the one or more processors to perform operations comprising:
receiving claims data indicating a claim status, the claim status including at least one of a pending status, a paid status, or a denied status;
generating metrics based at least in part on the claims data, the metrics including:
a first metric including a first number of the claims from the claims data;
a second metric including a second number of the claims indicated to be paid;
a third metric including price data representing a contractual price for individual ones of the second number of the claims; and
a fourth metric including a plan responsibility value associated with the second number of the claims;
generating training data by using a portion of the claims data associated with the metrics;
generating additional training data by resampling the portion of the claims data based at least in part on the training data including insufficient data for accurate predictions, wherein the insufficient data for accurate predictions is based at least in part on a confidence level associated with the training data;
training one or more machine learning (ML) models using the training data including the additional training data to classify input metrics by metrics categories and to predict output reserves with associated confidence levels and determine associated weights for the metrics, wherein training the one or more ML models includes generating an actuarial model to receive the input metrics and to determine the output reserve with an associated confidence level that is above threshold level;

determining a reserve prediction value using the actuarial model;

storing the metrics and the reserve prediction value as data objects, the data objects including a label with a current date;

causing an application to change an amount of money held in reserve based at least in part on the reserve prediction value, wherein the change to the amount of money is performed automatically by the system;

generating a user interface configured to display the metrics and the reserve prediction value, the user interface including one or more selectable options to change one or more of the metrics; and causing the user interface to display an alert associated with the reserve prediction value based at least in part on the change to the amount of money being performed automatically.

2. The system of claim 1, wherein the application comprises a first application, and the operations further comprise:

determining a change threshold based at least in part on a pattern of incremental changes for the claim status of the claims being denied during a specified time period;

determining that a change in a denial rate exceeds the change threshold based at least in part on the first metric and the second metric;

generating an alert based at least in part on the change in the denial rate exceeding the change threshold; and sending notification data representing the alert to a computing device, the notification data causing a second application associated with the computing device to initiate and display at least a portion of the alert.

3. The system of claim 2, the operations further comprising:

generating a time series graph associated with the denial rate within the specified time period; and indicating on the time series graph the change in the denial rate exceeding the change threshold.

4. The system of claim 1, wherein the reserve prediction value comprises a first reserve prediction value, and the operations further comprise:

receiving an indication that the contractual price has increased or decreased;

causing the third metric to be updated to an updated third metric based at least in part on the indication;

determining, using the actuarial model, a second reserve prediction value based at least in part on the updated third metric; and causing the application to change the amount of money held in reserve based at least in part on the second reserve prediction value.

5. The system of claim 1, wherein the reserve prediction value comprises a first reserve prediction value, and the operations further comprise:

causing the user interface to display the first metric, the second metric, the third metric, and the fourth metric as editable fields;

receiving input data representing user input to change at least one of the first metric, the second metric, the third metric, or the fourth metric;

determining a second reserve prediction value based at least in part on the input data; and causing the user interface to display the second reserve prediction value.

6. A method, comprising:

receiving data associated with claims;

determining metrics based at least in part on the data, the metrics including:

a first metric including a first number of the claims from the data;

a second metric including a second number of the claims indicated to be paid; and a third metric including price data representing a contractual price for individual ones of the second number of the claims;

generating training data by using a portion of the data associated with the metrics;

training one or more machine learning (ML) models using the training data to classify input by metrics categories and to predict an output reserve, wherein the one or more ML models includes an actuarial model to receive input metrics and to determine the output reserve;

determining a reserve prediction value using the actuarial model;

storing the metrics and the reserve prediction value as data objects, the data objects including a label with a current date; and causing an application to change an amount of money held in reserve based at least in part on the reserve prediction value.

7. The method of claim 6, further comprising:

determining the training data includes insufficient data for accurate predictions, wherein to make accurate predictions is based at least in part on determining a confidence level associated with the training data;

generating additional data for the training data by resampling the portion of the data associated with the metrics, wherein second training data includes the training data and the additional data;

determining the second training data includes sufficient data for accurate predictions, wherein the accurate predictions is based at least in part on a confidence level associated with the second training data is above a threshold level; and generating a user interface configured to display the metrics and the reserve prediction value, the user interface including one or more selectable options to change one or more metrics.

8. The method of claim 6, wherein the data comprises first data and the metrics comprises first metrics, and further comprising:

receiving second data associated with the claims;

determining second metrics based at least in part on the second data, a fourth metric of the second metrics includes a plan responsibility value associated with the second number of the claims; and training new ML models using the second data as new training data, the new ML models includes a second actuarial model.

9. The method of claim 6, further comprising:

determining that a denial rate change exceeds a threshold based at least in part on the first metric and the second metric; and generating an alert based at least in part on the denial rate change.

10. The method of claim 9, wherein the alert identifies one or more factors affecting the denial rate change, the one or more factors including one or more of a benefit design change, a premium rate change, or an aging members block.

11. The method of claim 9, wherein the application further comprises a first application, and further comprising:
generating a time series graph associated with the denial rate change; and
sending notification data representing the alert to a computing device, the notification data causing a second application associated with the computing device to initiate and display at least a portion of the alert and the time series graph.

12. The method of claim 6, wherein the reserve prediction value comprises a first reserve prediction value, and further comprising:
causing a user interface to display at least one of the first metric, the second metric, or the third metric as editable fields;
receiving input data representing user input to change the at least one of the first metric, the second metric, or the third metric;
determining a second reserve prediction value based at least in part on the input data; and
causing the user interface to display the second reserve prediction value.

13. The method of claim 12, further comprising:
receiving second input data representing second user input to save the change to the at least one of the first metric, the second metric, or the third metric; and
generating a second actuarial model based at least in part on saving the change.

14. A system, comprising:
one or more processors; and
computer-readable media storing first computer-executable instructions that, when executed by the one or more processors, cause the one or more processors to perform operations comprising:
receiving data associated with claims;
determining one or more metrics from the data based at least in part on information correlated with predicting reserves for the claims;
generating training data by using a portion of the data associated with the one or more metrics;
generating additional training data by resampling the portion of the data based at least in part on the training data including insufficient data for accurate predictions, wherein the insufficient data for accurate predictions is based at least in part on a confidence level associated with the training data;
training an actuarial model using the training data and the additional training data to receive input metrics and output a reserve prediction;
determining a reserve prediction value using the actuarial model;
storing the metrics and the reserve prediction value as data objects; and
causing an application to change an amount of money held in reserve based at least in part on the reserve prediction value.

15. The system of claim 14, wherein generating the additional training data further comprises:
generating the additional training data by projecting claims data from the data associated with the claims and projecting corresponding metrics.

16. The system of claim 14, the operations further comprising:
generating new training data by including the data objects with the training data; and
training a new actuarial model using the new training data.

17. The system of claim 14, the operations further comprising:
generating a user interface configured to display the one or more metrics and the reserve prediction value, the user interface including one or more selectable options to change at least one of the one or more metrics.

18. The system of claim 14, the operations further comprising:
generating a time series graph associated with the one or more metrics within a specified time period;
determining that a rate of change for at least one of the one or more metrics exceeds a threshold; and
indicating on the time series graph the rate of change for the at least one of the one or more metrics exceeding the threshold.

19. The system of claim 14, the operations further comprising:
performing stochastic modeling on the one or more metrics;
determining a confidence level for the one or more metrics; and
determining to automatically perform data analysis daily based at least part on the confidence level being above a threshold.

20. The system of claim 14, the operations further comprising:
performing stochastic modeling on the one or more metrics;
determining a confidence level for the one or more metrics;
changing a second metric of the one or more metrics based at least in part on the confidence level being below a threshold level;
storing the one or more metrics as data objects including labels for dates;
generating new training data by including the data objects with the training data;
training a second actuarial model using the new training data; and
determining a third prediction using the second actuarial model.

* * * * *